United States Patent [19]

Nakanishi

[11] Patent Number: 4,993,278
[45] Date of Patent: Feb. 19, 1991

[54] COLUMN-MOUNTED GEAR SELECTOR MECHANISM FOR AUTOMATIC TRANSMISSION

[75] Inventor: Yoshiyuki Nakanishi, Atsugi, Japan

[73] Assignee: Nissan Motor Co., Ltd., Yokohama, Japan

[21] Appl. No.: 509,448

[22] Filed: Apr. 16, 1990

[30] Foreign Application Priority Data

Apr. 24, 1989 [JP] Japan .................................. 1-105576

[51] Int. Cl.⁵ .............................................. G05G 9/06
[52] U.S. Cl. .................................... 74/484 R; 74/473
[58] Field of Search ................. 74/484 R, 486, 473 R, 74/473 SW, 335

[56]                References Cited
            U.S. PATENT DOCUMENTS 2,841,028  7/1958  Adloff ................................... 74/484
3,853,019 12/1974  McAdams ......................... 74/484 X
4,546,664 10/1985  Mylander .......................... 74/473 R

FOREIGN PATENT DOCUMENTS 48-25421 of 0000 Japan .

Primary Examiner—Richard E. Moore
Attorney, Agent, or Firm—Pennie & Edmonds

[57] ABSTRACT

A column-mounted gear selector mechanism comprises a gear shift lever assembly including a control arm integrally connected to a shift tube and projecting radially outwards therefrom to have a free end, a bell crank installed in the control arm and having a first lever arm pivotally connected to a compression rod, a knob pivotally installed on the free end of the control arm and formed with an elongated guide opening, a guide pin movable in the guide opening, and a connecting rod interconnecting the guide pin and a second lever arm of the bell crank such that turns of the knob in the opposite direction about the axis thereof are transmitted through the connecting rod and the bell crank to the compression rod to cause the compression rod to reciprocate between first and second positions. The shift tube is rotatable about its axis for shift of gear. The compression rod is operatively connected to an interlocking device such that the interlocking device prevents rotation of the shift tube when the compression rod is in the first position and allows it when the same is in the second position.

4 Claims, 3 Drawing Sheets

COLUMN-MOUNTED GEAR SELECTOR MECHANISM FOR AUTOMATIC TRANSMISSION

BACKGROUND OF THE INVENTION

1. Field of the Invention

The present invention relates to a column-mounted gear selector mechanism for an automatic transmission.

2. Description of the Prior Art

An example of a prior art column-mounted gear selector mechanism for an automatic transmission is disclosed in Japanese Utility Model Provisional Publication No. 48-25421 and also shown in FIGS. 2 and 3.

The gear selector mechanism 10 includes a compression rod 12 disposed in parallel relation to a steering column assembly 14 and operatively connected at the lower end thereof to an interlocking device. The compression rod 12 is reciprocatively movably received within a shift tube 16 which is rotataly supported on a steering column assembly 14. The shift tube 16 is operatively connected to a control cable 18 of an automatic transmission by way of a linkage 20 and rotatable about its axis for shift of gear. A gear shift lever 22 is disposed adjacent to a steering wheel 24 and operatively connected to the upper end of the compression rod 12. A wiper control lever 26 is disposed between the steering wheel 24 and the gear shift lever 22 and installed on the upper end of the steering column assembly 14.

As shown in FIG. 3, the gear shift lever 22 includes a first lever section 28 pivotally connected at one end 28a to the upper end 12a of the compression rod 12 and pivotally installed at the other end 28b on a pivot pin 30 which is in turn installed on the shift tube 20 so as to be swingable between the solid line position and the two-dot chain line position while allowing the compression rod 12 to reciprocate upwardly and downwardly. The gear shift lever 22 further has a second lever section 32 in line with the first lever section 28. The second lever section 32 is integrally attached at one end 32a to the other end 28b of the first lever section 28 and has fixedly installed at the other end 28b a knob 34 disposed adjacent to the wiper control lever 26.

With the above structure, shift of gear is attained by first pushing the compression rod 12 downwardly to unlock the interlocking device and then rotating the shift tube 16. Such movements of the compression rod 12 and shift tube 16 are attained by first turning the gear shift lever 22 about the pivot 30 toward the steering wheel 24 and then turning the same about the axis of the shift tube 16.

With such a prior art gear selector mechanism 10, a considerable space is required between the gear shift lever 22 and the wiper control lever 26 so that one of them does not become an obstacle of the other in use. The necessity of such a space inevitably results in an increased design and layout restriction of the gear selector mechanism.

SUMMARY OF THE INVENTION

In accordance with the present invention, there is provided a column-mounted gear selector mechanism for an automatic transmission. The gear selector mechanism comprises a reciprocative compression rod in parallel relation to a steering column assembly, and a shift tube movably receiving therein the compression rod and rotatably supported on the steering column assembly.

The shift tube is operatively connected to a control cable of the automatic transmission in such a manner as to be capable of shifting gear when rotated about its axis. The compression rod is reciproctative between first and second positions and operatively connected to an interlocking device in such a manner that the interlocking device prevents rotation of the shift tube when the compression rod is in the first position and allows rotation of the shift tube when the compression rod is in the second position.

The gear selector mechanism further comprises a gear shift lever assembly operatively connected to the compression rod and the shift tube for operating the same. The gear shift lever assembly includes a hollow control arm secured at an end to the shift tube and projecting radially outwards therefrom to have a free end, a bell crank pivotally installed in the control arm and having a first lever arm connected to the compression rod and a second lever arm, a knob pivotally installed on the free end of the control arm and formed with an elongated guide opening, a guide pin movably received in the elongated opening of the knob and a connecting rod interconnecting the second lever arm of the bell crank and the guide pin such that turns of the knob in the opposite directions about a pivot axis thereof are transferred through the connecting rod and the bell crank to the compression rod to cause the compression rod to reciprocate between the first and second positions.

The above structure is effective for solving the above noted problem inherent in the prior art mechanism.

It is accordingly an object of the present invention to provide an improved column-mounted gear selector mechanism which can reduce the design and layout restrictions.

It is a further object of the present invention to provide an improved column-mounted gear selector mechanism of the above described character which makes it possible to arrange a gear shift lever nearer to a wiper control lever and a steering wheel than before.

It is a further object of the present invention to provide an improved column-mounted gear selector mechanism of the above described character which can assuredly prevent one of the gear shift lever and the wiper control lever from becoming an obstacle of the other in use and is therefore desirable from a safety driving point of view.

It is a further object of the present invention to provide an improved column-mounted gear selector mechanism of the above described character, the operation of which can be attained with a less effort and therefore with ease and efficiency.

DESCRIPTION OF THE PREFERRED EMBODIMENT

Figure 1:
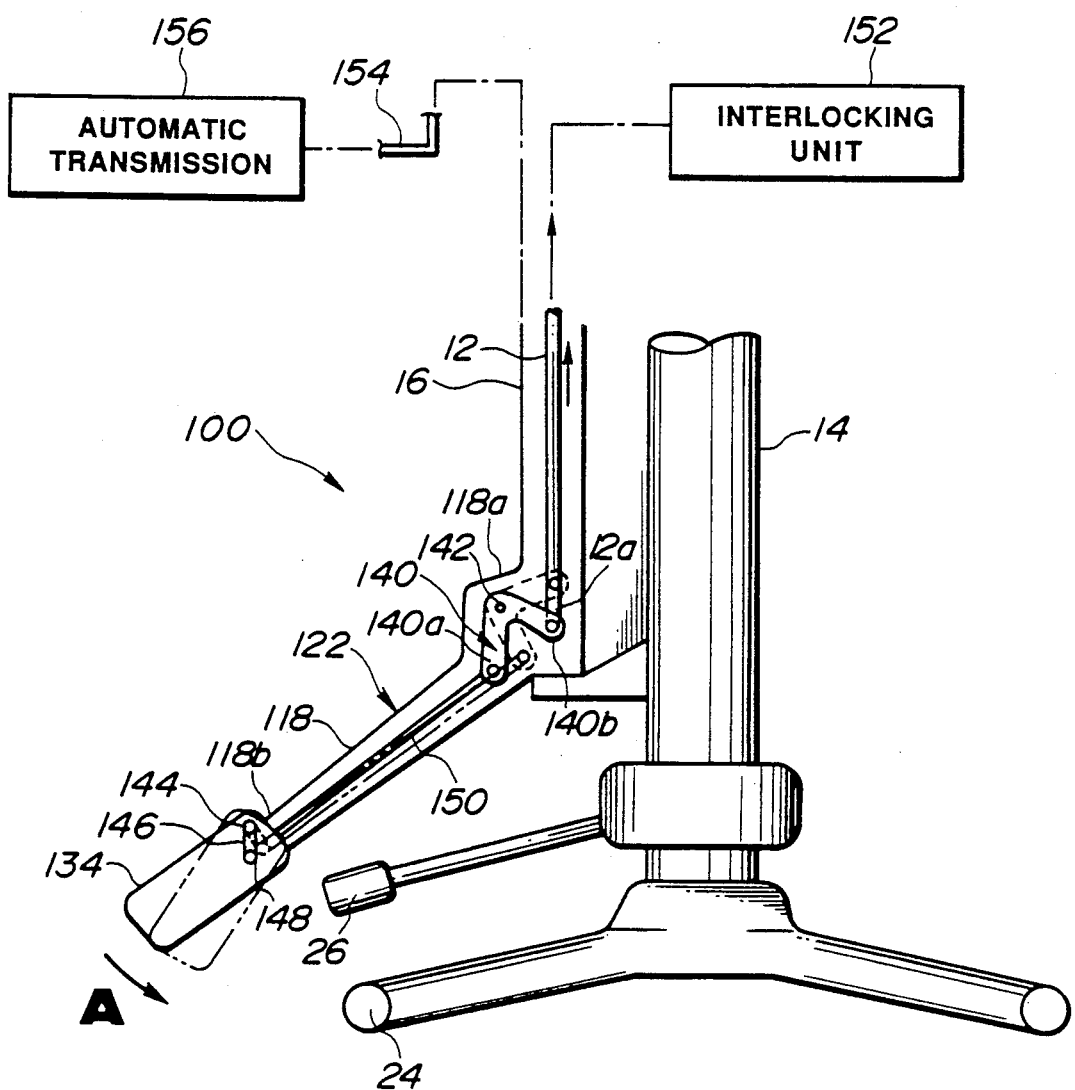
FIG. 1 is a fragmentary side elevational view of a column-mounted gear selector mechanism for an automatic transmission according to an embodiment of the present invention.
Figure 2:
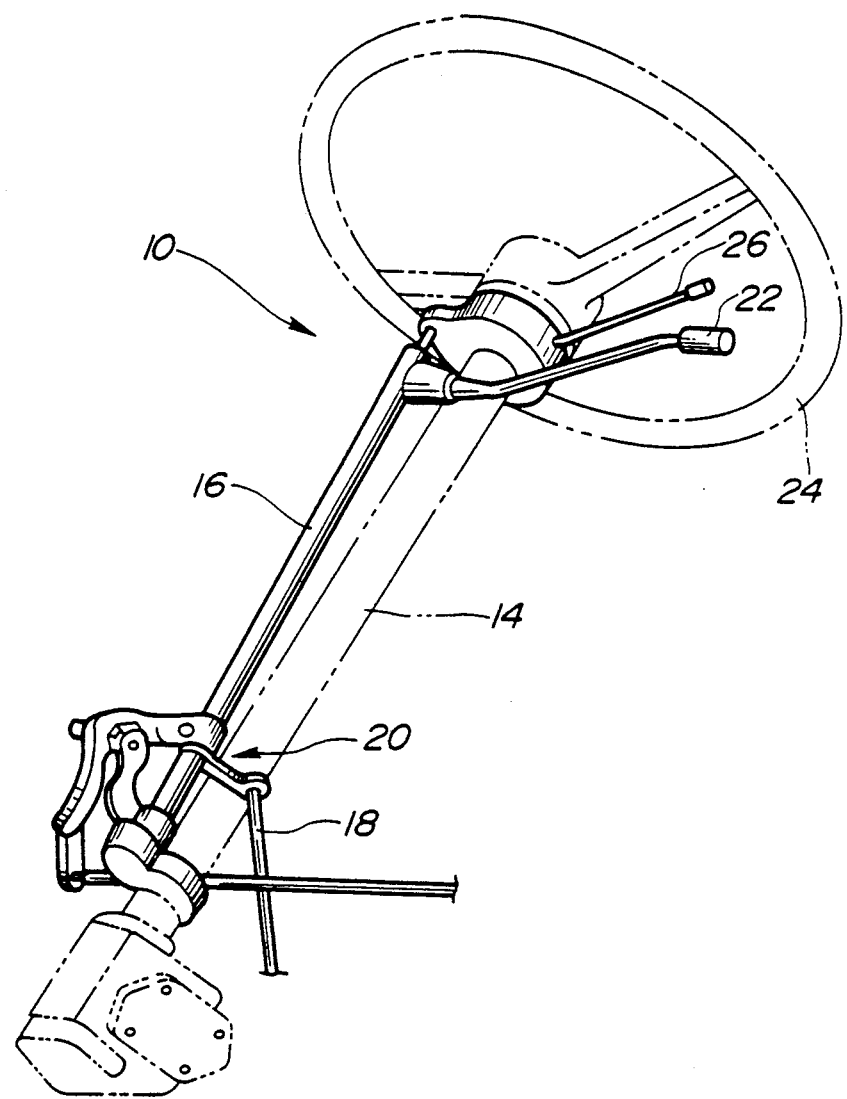
FIG. 2 is a perspective view of a prior art column-mounted gear selector mechanism for an automatic transmission.
Figure 3:
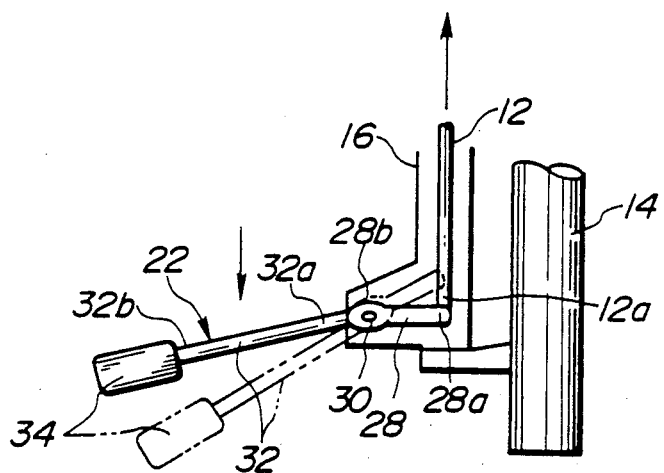
FIG. 3 is a fragmentary side elevational view of the prior art column-mounted gear selector mechanism of FIG. 2.

FIG. 1 shows a column-mounted gear selector mechanism for an automatic transmission according to the present invention, in which parts and portions similar to those of the prior art mechanism of FIGS. 2 and 3 are designated by the same reference numerals and repeated description thereof is omitted.

The gear selector mechanism of this invention is generally indicated by the reference numeral 100 and includes a gear shift lever assembly 122 which consists of an hollow control arm 118 secured at one end portion 118a to the shift tube 14 and projecting radially therefrom toward the other end portion 118b. A bell crank 140 is disposed in the end portion 118a of the hollow arm 118 and pivotally installed at an intermediate portion 140a thereof on a pivot 142 which is in turn installed on the hollow arm 118. The bell crank 140 is pivotally connected at a first lever arm 140b to the upper end 12a of the compression rod 12. A knob 134 is pivotally mounted on a pivot pin 144 which is in turn monted on the hollow arm 118 and formed with an elongated guide opening 146 serving as a cam. A guide pin 148 serving as a cam follower is movably received in the opening 146. A connecting rod 150 is installed in the hollow control arm 118 to interconnect the guide pin 146 and a second lever arm 140c of the bell crank 140 in such a manner that turns of the knob 134 in the opposite directions about the pivot pin 144 cause the bell crank 140 to oscillate about the pivot pin 142 while causing the compression rod 12 to reciprocate upwardly and downwardly.

The compression rod 12 is reciprocative between first and second positions and operatively connected to a conventional interlocking device 152. The interlocking device 152 prevents rotation of the shift tube 16 about its axis when the compression rod 12 is in the first position, i.e., in the upper position under the bias of a biasing device (not shown) since it is not subjected to a driving force from the bell crank 140. The interlocking device 152 allows rotation of the shift tube 16 about its axis when the compression rod 12 is in the second position, i.e., in the lower position, being driven by the bell crank 140 against the bias of the biasing device. The compression rod 12 is urged into the first position under the bias of the biasing device while urging the knob 134 into a position in line with the control arm 118. In this connection, the guide opening 146 is elongated slantwise with respect to a longitudinal axis of the knob 134 so as to receive the guide pin 148 in an end portion remoter from the steering column assembly 14 and nearer to the steering wheel 24 when the compression rod 12 is in the first position and the knob 134 is held substantially in line with the control arm 118. The relation between the turning angle of the knob 134 and the resulting longitudinal movement of the connecting rod 150 is determined desiredly depending upon the slant of the guide opening 146 with respect to the longitudinal axis of the knob 134.

The shift tube 16 is operatively connected to a control cable 154 of a conventional automatic transmission 156 in such a manner as to be capable of shifting gear when rotated about its axis.

With the above structure, a turn of the knob 134 in the direction of the arrow "A", i.e., toward the steering wheel 24 causes the guide pin 148 to move in the opening 146 toward the pivot pin 144 while driving, by way of the connecting rod 148, the bell crank lever 140 to turn anticlockwise in the drawing about the pivot pin 142 and thereby causing the compression rod 12 to move downwardly into the second position. By this, the interlocking device 152 is unlocked, thus making it possible to turn the shift tube 16 about its axis together with the gear shift lever 122 for attaining shift of gear.

From the foregoing, it will be understood that since only the knob 134 is moved toward the steering wheel 24 and the wiper control lever 26 upon shift of gear the space required between the gear shift lever assembly 122 and the wiper control lever 26 can be considerably reduced, i.e., the gear shift lever assembly 122 can be arranged nearer to the wiper control lever 26 and the steering wheel 24 than before.

It will be further understood that the operation of the knob 134 requires a less effort of a driver, thus making it possible to attain shift of gear with ease and efficiency.

It will be further understood that by designing so that the control arm 118 of the gear shift lever assembly 122 projects more radially outwards from the steering column assembly 14 than the wiper control lever 26 it becomes possible to assuredly prevent one of the gear shift lever assembly 122 and the wiper control lever 26 from becoming an obstacle of the other in use.

What is claimed is:

1. A column-mounted gear selector mechanism for an automatic transmission, comprising:

a reciprocative compression rod in parallel relation to a steering column assembly;

a shift tube movably receiving therein said compression rod and rotatably supported on the steering column assembly;

said shift tube being operatively connected to a control cable of the transmission in such a manner as to be capable of shifting gear when rotated about its axis;

said compression rod being reciprocative between first and second positions and operatively connected to an interlocking device in such a manner that the interlocking device prevents rotation of said shift tube when said compression rod is in the first position and allows rotation of said shift tube when said compression rod is in the second position;

a gear shift lever assembly operatively connected to said compression rod and said shift tube for operating the same;

said gear shift lever assembly including a hollow control arm secured at an end to said shift tube and projecting radially outwards therefrom to have a free end, a bell crank pivotally installed in said control arm and having a first lever arm connected to said compression rod and a second lever arm, a knob pivotally installed on the free end of said control arm and formed with an elongated guide opening, a guide pin movably received in said elongated opening of said knob and a connecting rod interconnecting said second lever arm of said bell crank and said guide pin such that rotations of said knob in the opposite directions about a pivot axis thereof are transferred through said connecting rod and said bell crank to said compression rod to cause said compression rod to reciprocate between said first and second positions.

2. The column-mounted gear selector mechanism as claimed in claim 1 wherein said knob is elongated longitudinally of said connecting rod, and said guide opening is elongated slantwise with respect to a longitudinal axis of said knob.

3. The column-mounted gear selector mechanism as claimed in claim 2 wherein said knob is swingable toward and away from a steering wheel.

4. The column-mounted gear selector mechanism as claimed in claim 1 wherein a wiper control lever is disposed between said gear shift lever assembly and the steering wheel, and said control arm of said gear shift lever assembly projects more radially outwards from the steering column assembly than the wiper control lever.

* * * * *